(12) United States Patent
Hillerup Lyhne et al.

(10) Patent No.: US 11,002,458 B2
(45) Date of Patent: May 11, 2021

(54) METHOD FOR CARRYING OUT AN OUTSIDE TEMPERATURE-RELATED CONTROL

(71) Applicant: GRUNDFOS HOLDING A/S, Bjerringbro (DK)

(72) Inventors: Casper Hillerup Lyhne, Aabyhøj (DK); Peter Elvekjær, Ulstrup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 16/485,300

(22) PCT Filed: Feb. 14, 2018

(86) PCT No.: PCT/EP2018/053628
§ 371 (c)(1),
(2) Date: Aug. 12, 2019

(87) PCT Pub. No.: WO2018/149854
PCT Pub. Date: Aug. 23, 2018

(65) Prior Publication Data
US 2019/0376714 A1 Dec. 12, 2019

(30) Foreign Application Priority Data
Feb. 14, 2017 (EP) ................................ 17155957

(51) Int. Cl.
*G05D 23/19* (2006.01)
*F24F 11/00* (2018.01)
(Continued)

(52) U.S. Cl.
CPC .......... *F24F 11/63* (2018.01); *G05D 23/1917* (2013.01); *F24F 11/58* (2018.01); *F24F 2110/10* (2018.01)

(58) Field of Classification Search
CPC .................................. F24F 11/58; F24F 11/63
See application file for complete search history.

(56) References Cited

U.S. PATENT DOCUMENTS

2010/0070234 A1* 3/2010 Steinberg ............ G01M 99/005
702/130
2011/0282504 A1* 11/2011 Besore ...................... H02J 3/14
700/291

(Continued)

FOREIGN PATENT DOCUMENTS

EP 1866575 A1 12/2007
WO 2006055334 A1 5/2006

*Primary Examiner* — Mark A Connolly
(74) *Attorney, Agent, or Firm* — McGlew and Tuttle, P.C.

(57) ABSTRACT

A method carries out an outside temperature-dependent control of at least one thermal power indicative parameter of a supply temperature of a first heating or cooling system in a first building (H). The control is carried out on the basis of the at least one thermal power indicative parameter. The at least one thermal power indicative parameter is indicative of the heat consumption or of the cooling power of at least one second heating or cooling system of a second building (H', H", H'"), located at a distance from the first building, and is received via a data network (1), in particular, via the Internet. An arrangement is provided for controlling a first heating or cooling system of a first building, wherein the arrangement is adapted to carry out the method mentioned above. A server is further provided that is adapted to receive at least one thermal power indicative parameter.

14 Claims, 3 Drawing Sheets

(51) Int. Cl.
*F24F 11/63* (2018.01)
*F24F 11/58* (2018.01)
*F24F 110/10* (2018.01)

(56) References Cited

U.S. PATENT DOCUMENTS

| | | |
|---|---|---|
| 2013/0190940 A1 | 7/2013 | Sloop et al. |
| 2014/0266755 A1* | 9/2014 | Arensmeier ............. F24F 11/62 340/679 |
| 2016/0280040 A1 | 9/2016 | Connell et al. |
| 2016/0356515 A1 | 12/2016 | Carter |
| 2019/0383507 A1* | 12/2019 | Quazi ...................... F24F 11/61 |

* cited by examiner

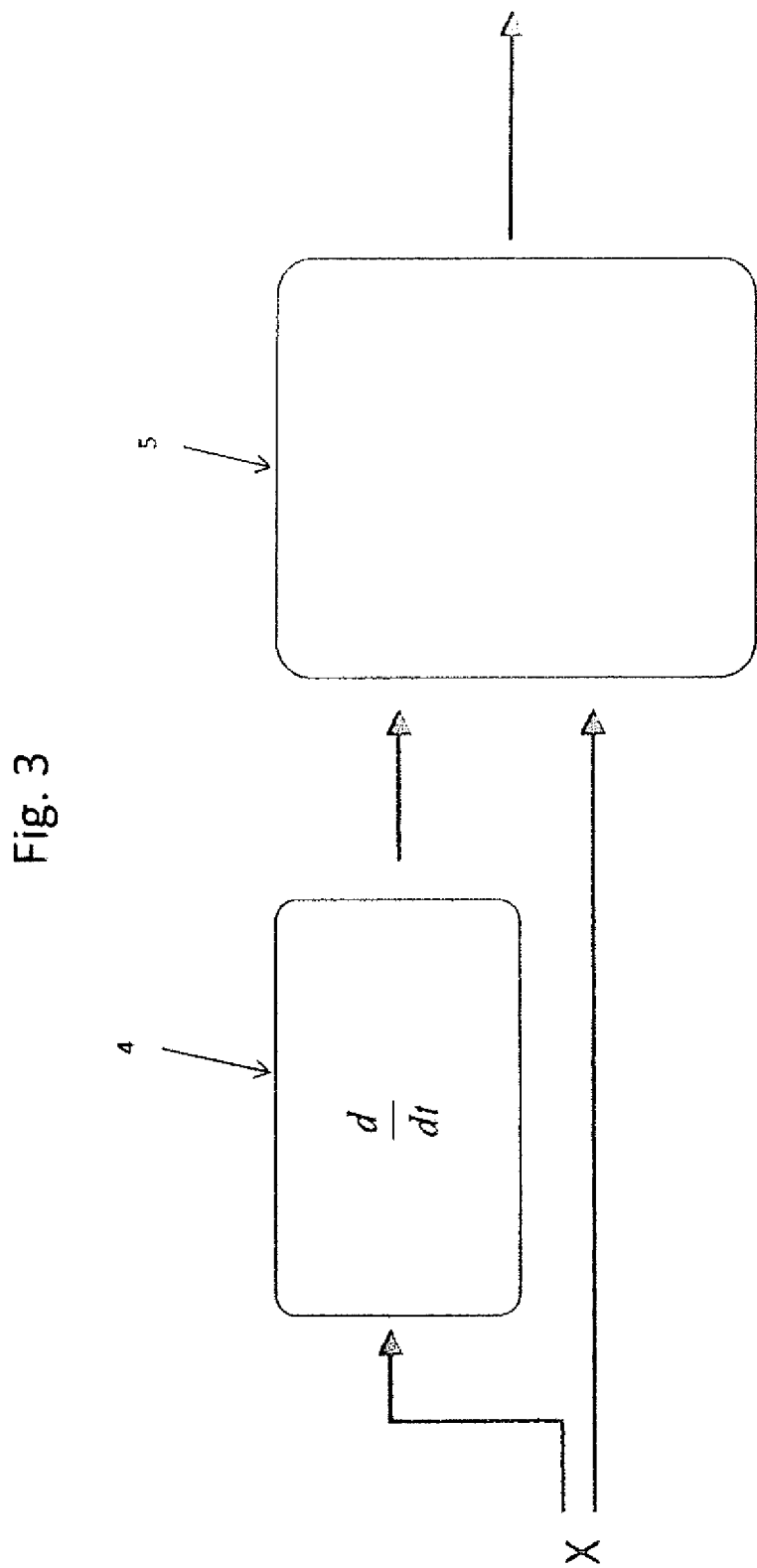

METHOD FOR CARRYING OUT AN OUTSIDE TEMPERATURE-RELATED CONTROL

CROSS REFERENCE TO RELATED APPLICATIONS

This application is a United States National Phase Application of International Application PCT/EP2018/053628 filed Feb. 14, 2018, and claims the benefit of priority under 35 U.S.C. § 119 of European Application 17 155 957.8, filed Feb. 14, 2017, the entire contents of which are incorporated herein by reference.

TECHNICAL FIELD

The present invention relates to a method for carrying out an outside temperature-related control, an arrangement for controlling a first heating or cooling system, and a server.

TECHNICAL BACKGROUND

In prior art, regulation of heating or cooling systems typically is carried out by using implementing a regulation as a function of weather data and building data. For accomplishing a reliable regulation procedure, however, it is critical to collect the necessary building specific information and weather forecast data, and to implement a regulator which is configured to calculate settings based on the particular building specific information and weather forecast data. All approaches known from prior art for applying regulation as a function of the above mentioned specific building data and weather forecast data are complicated and expensive.

SUMMARY

Therefore, the problem on which the present invention is based is the provision of a simpler and less expensive solution for controlling a heating or cooling system on the basis of specific building data and external data.

This problem is solved by a method for carrying out an outside temperature-related control having the features according to the invention, an arrangement for controlling a first heating or cooling system having the features according to the invention, and a server having the features according to the invention.

According to the present invention, a method for carrying out an outside temperature-related control of a thermal property of at least a portion at least a first building by regulation of a supply temperature of a first heating or cooling system in a first building is provided, wherein the control is carried out on the basis of the at least one thermal power indicative parameter, wherein the at least one thermal power indicative parameter is indicative of the heat consumption or on the cooling power of at least one second heating or cooling system of a second building being located at a distance from the first building, and is received via a data network, in particular, via the Internet. Thus, according to the inventive method, by collecting at least one thermal power indicative parameter of other buildings continuously, it is possible to regulate a heating or cooling system in an improved and simpler manner. For example, buildings that are located at a distance from the first building may be subject to a whether change, as a cold front or a heat wave or the like. Gathering the data from the other buildings, namely, collecting thermal power indicative parameters which are indicative of the heat consumption from these other buildings continuously and determining arising changing weather conditions for the first building on the basis of these parameters enables an accordingly adapted and continuous feed-forward based regulation of the heating or cooling system of the first building. Thermal property may include comfort. The comfort may depend on indoor temperature, thermal radiation (e.g. from indoor walls), and draught (e.g. from a ventilation duct). Accordingly, the method may control any of these parameters. The regulation is carried out by regulation of a supply temperature of a first heating or cooling system of the first building. The first building and the second or additional buildings may be any kind of building, for example, domestic buildings, public buildings, and industrial buildings including greenhouses.

According to the invention, a first heating or cooling system in the first building receives a (leading) signal indicative of the time derivative of the at least one thermal power indicative parameter from a data storage for controlling the at least one thermal power indicative parameter.

According to a preferred embodiment, data indicative of the heat consumption or data concerning the cooling power of the at least one second heating or cooling system is collected continuously. The expression "continuously" should be understood as also including a collection of data "intermittently", for example, on a regular, in particular, a predefined, basis.

According to a further preferred embodiment, the time derivative of the at least one thermal power indicative parameter are determined.

Preferably, the distance of the at least one second building to the first building is incorporated into the control of the at least one thermal power indicative parameter of the first heating or cooling system according to the (leading) signal.

It is also advantageous, if the at least one thermal power indicative parameter indicative of the heat consumption or the cooling power of a plurality of additional heating or cooling systems of respective additional buildings being located at a distance from the first building.

The correlation between the at least one thermal power indicative parameter of the first building and the additional heating or cooling systems of respective additional buildings may be determined.

Also, a gain factor may be assigned to each of the additional buildings, wherein the gain factor may be based on the relation between the at least one thermal power indicative parameter of the first building, and the additional heating or cooling systems of respective additional buildings may be determined. Please note that the term "relation" may also be understood within the meaning of "correlation".

According to another preferred embodiment, the first heating system in the first building is a floor heating system. Since floor heating systems need some lead time for adapting to new settings, the method is particularly well suited for their regulation since, for example, upcoming weather changes are known in advance and thus, due to the continuous feed-forward regulation, there is sufficient time for the floor heating system to adapt to new settings.

Preferably, the data calculated from the heat consumption or the cooling power received from the additional heating or cooling systems of the additional buildings is incorporated into the (leading) signal in a weighted manner. This can provide an even more improved regulation of the heating or cooling system.

Moreover, it is preferable, if a determination of the accuracy of controlling of the at least one thermal power indicative parameter according to the leading signal is carried out, again leading to an even more improve regulation procedure.

The control of the thermal property indicative parameter further may be based on
- predetermined comfort specifications with respect to temperature, in particular, according to the time of day;
- the energy flow rate and/or
- additional control information being transmitted by a user.

Incorporation of those data into the regulation procedure makes the latter even more precise.

Further, it is noted that the method is only indirectly dependent on the outside temperature. Other parameters such as wind speed or the weather which may be sunny or cloudy may also be important.

According to a further preferred embodiment, components are arranged in the first heating or cooling system, in particular, a circulation pump, at least one heat exchanger, and/or at least one valve, receive control data directly from the cloud-based data storage. However, the data received by these components may not necessarily be stored in the cloud-based data storage. Other data storage devices, as for example a central dedicated server or a plurality of servers or devices may just as well be implemented for this purpose.

Further, the calculations may be carried out at various locations including a central cloud-based server or alternatively locally in a control device arranged in each one of the buildings.

Advantageously, the method may apply machine learning, for example, by application of an artificial neural network.

According to still a further embodiment, the gain factors are adjusted on an ongoing basis. Thus, according to the method described above, the gain factors which may change over time are optimized continuously.

According to the present invention, also an arrangement for controlling a first heating or cooling system of a first building is provided, wherein the arrangement is adapted to carry out the method for carrying out an outside temperature-dependent control of the at least one thermal power indicative parameter of a supply temperature of a first heating or cooling system in a first building.

Further, according to the present invention, a server is provided, the server being adapted to receive at least one thermal power indicative parameter from at least one second heating or cooling system of a second building via a data network, in particular via the Internet, and being adapted to provide the data to a first heating and cooling system of a first building via the data network, wherein the at least one thermal power indicative parameter serves for influencing the at least one thermal power indicative parameter of the first heating or cooling system, and wherein the at least one thermal power indicative parameter is based on the heat consumption or the cooling power of the at least one second heating or cooling system.

Further details and features of the invention as well as concrete embodiments of the invention may be derived from the following description in connection with the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic figure of a continuous feed-forward regulation procedure.

DESCRIPTION OF PREFERRED EMBODIMENTS

Figure 1:
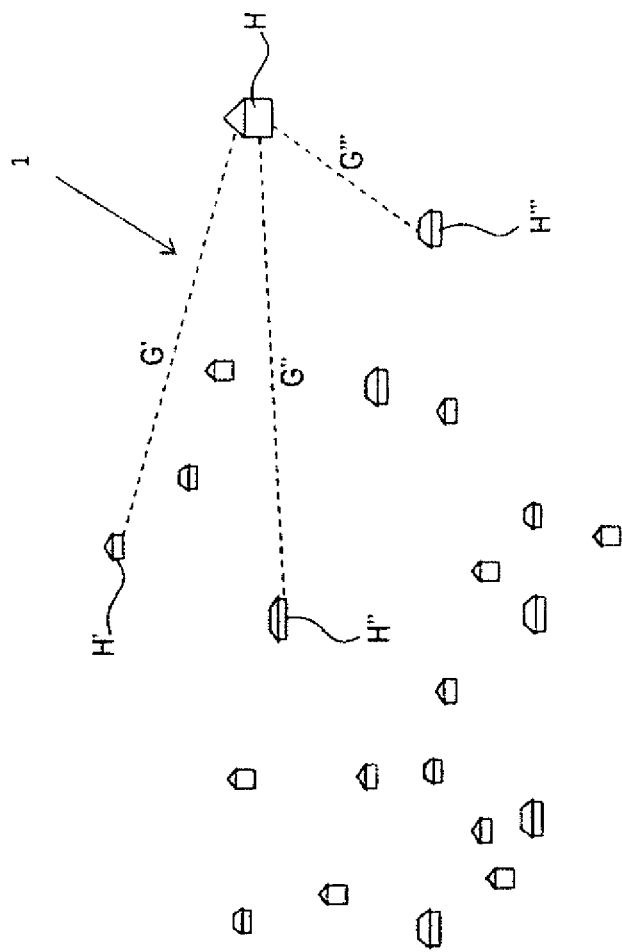
FIG. 1 is a schematic view of a scenario including various buildings with respective heating or cooling systems.
Figure 2:
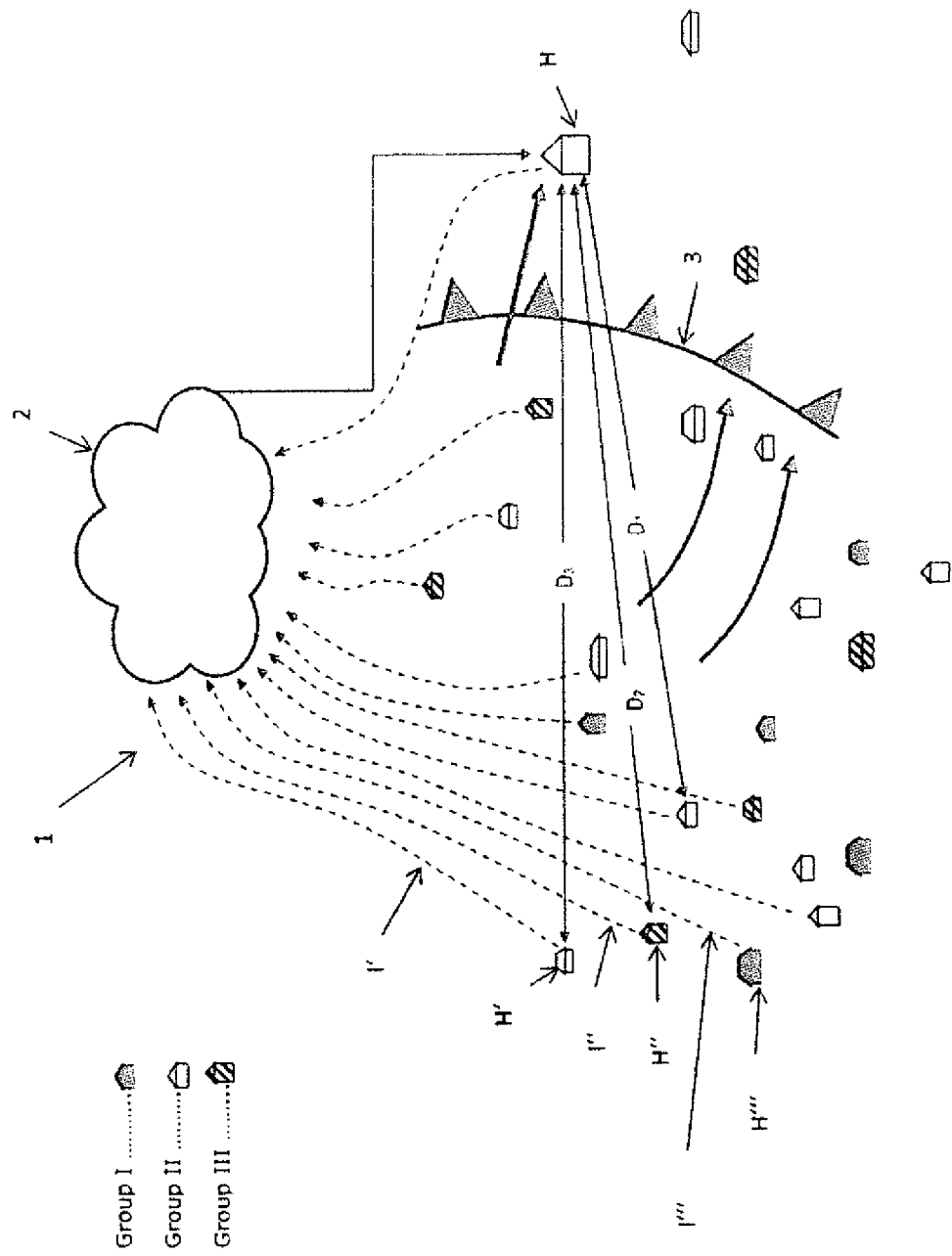
FIG. 2 is another schematic view of another scenario including various buildings with respective heating or cooling systems.

Referring to the drawings, FIG. 1 is a schematic view of a first scenario including various buildings with respective heating or cooling systems. Here, a first building is indicated by the reference numeral H, and second buildings or additional buildings are indicated by reference numerals H', H", and H'". These three additional buildings are representative for a number of additional buildings which are shown in this figure, but which are not individually indicated by reference numerals. As shown in FIG. 2 all buildings are connected to a central unit via a network 1 which is schematically indicated by the dashed lines connecting the buildings H, H', H", H'" and a central unit 2. All buildings H, H', H", H'" are equipped with respective heating or cooling systems which are not shown here in detail but which are commonly known. The heating or cooling systems may include electric heating or cooling systems as well as fluid-based heating or cooling systems including one or more pumps.

The method for carrying out an outside temperature-related control of a thermal property of at least a portion of the first building H by regulation of a supply temperature of a first heating or cooling system in the first building H involves the control being carried out on the basis of the one or more thermal power indicative parameter/parameters which is/are indicative of the heat consumption or on the cooling power of at least one second or additional heating or cooling system of a second building H' being located at a distance D from the first building, as will be explained in further detail with respect to FIG. 2.

Moreover, in this procedure, the relation (e.g. correlation) between the thermal power indicative parameter or parameters of the first building H and the additional heating or cooling systems of the respective additional buildings H', H", H'" are determined. Subsequently, the gain factors G', G", G'" are calculated for each additional building H', H", H'" whereby a high correlation between the thermal power indicative parameters of the first building H and the additional heating or cooling systems of, for example, an additional building H' will result in a high gain factor G'. Thus, highly correlated buildings are weighted higher than less correlated buildings. The gain factors may change over time and thus it may be an advantage that the method uses updated information including updated gain factors.

FIG. 2 is another schematic view of another scenario including various buildings with respective heating or cooling systems. Again, there is a first building H which is equipped with a heating or cooling system and a plurality of second or additional buildings H', H", H'" which respectively are also equipped with heating or cooling systems and which are located at respective distances D1, D2, D3 from the first building H. The heating or cooling system installed in the first building H is to be regulated on the basis of a continuous feed-forward based regulation based on heat consumption or cooling power information I, I', I", I'" which is sent from the additional buildings H', H", H'" to a cloud 2 via the network 1. The information on heat consumption or cooling power corresponds to thermal power indicative parameters used for regulating the heating or cooling system. However, as can be seen by the dashed line I, also the first building H sends its thermal power indicative parameters to the cloud 2. The thermal power indicative parameters may include flow, pressure, pump speed, heat flow (thermal energy), electricity consumption (e.g., if electric heating is used), valve positions, and the like. All of these thermal power indicative parameters are influenced by a weather change, as the cold front 3.

As can be seen in this figure, the buildings H', H", H'" have experienced a weather shift, namely, a cold front 3 which spreads towards the first building H. Now, the distances D1, D2, D3 from the buildings H, H', H" which are sending heat consumption or cooling power information I', I", I'" via the cloud 2 to the first building H which receives regulation information for its heating or cooling system from the cloud 2 are applied so as to regulate the feed-forward signal sent to the first building H from the cloud 2. As building H' has experienced the weather front first, its information I' on heat consumption or cooling power or thermal power indicative parameters, respectively, are sent to the cloud before information I" from building H" and I'" from building H'" which both experience the temperature drop at a later point of time. Then, according to an embodiment of the method for carrying out an outside temperature-dependent control, the direction of the cold front 3 is calculated based on a registered gradient $$\frac{dI}{dt}$$

whereby large gradients are expected to cause a faster regulation than smaller gradients.

Further, according to an embodiment of the method for carrying out an outside temperature-dependent control, a step of grouping the buildings H', H", H'" into a plurality of clusters or groups or categories according, for example, to their insulation properties may be carried out. Then, the first building H may be regulated on the basis of information of buildings which belong to the same insulation group. For example, a categorization may be applied according to the scheme given below:

Insulation group I: fast reacting buildings (buildings that do not have a well-insulated building shell)
Insulation group II: medium reacting buildings
Insulation group III: slow reacting buildings (buildings having a well-insulated building shell).

In FIG. 2, the buildings from group I are completely black, the buildings belonging to group II are completely white, and the buildings belonging to group III are hatched. Buildings belonging to the first group I may, however, be moved into another group on the basis of data received from the cloud 2. It is also possible to deselect buildings which do not belong to the relevant insulation group. The method may also be adaptive and thus learn to deselect buildings that do not provide suitable data for regulating the heating or cooling system of the first building H. This may be achieved on the basis of historic data.

After the step of grouping or categorizing the buildings H, H', H", H'", a further step of weighing the heat consumption or cooling power information I', I", I'", namely, the thermal power indicative parameters, may be carried out so as to even further improve the regulation procedure for the first building H.

Further, the method according to an embodiment may comprise a step of evaluating if the prediction for feed-forward regulation is good by calculation of the difference between the actual (measured in the respective building) and the optional predefined temperatures. It may be advantageous that the evaluation is applied to update the regulation steps used to carry out the method. Hereby, the method will be adaptive and constantly try to optimize the regulation steps in order to achieve the most desirable performance.

The method controls a thermal property of at least a portion of a first building H. The method may be applied to control a single room or a plurality of rooms of the building H.

In a preferred embodiment according to the invention the thermal property is a comfort specific parameter including the indoor temperature and preferably an additional parameter related to the temperature perception a person inside the building will experience. Accordingly, the method can be used to control the user specific comfort in a building.

Moreover, regulation of the heating or cooling system in the first building H may be carried out on the basis of Specified comfort specifications (e.g., 21° C. in the living room between 17 and 23 o'clock);
the flow rate of heating or cooling fluid media (e.g., regulated by the speed of one or more pumps);
the temperature of the heating or cooling fluid media;
information sent to the user of the building (e.g., an SMS comprising relevant information as "turn up the heat", "change the thermostat settings from 3 to 4", etc.;
the cloud may communicate directly with hardware (valves, pumps, and heat exchangers) configured to be controlled by external devices.

FIG. 3 is a schematic diagram of a continuous feed-forward regulation procedure showing how a thermal power indicative parameter X is input in a differntiator 4 which determines the time derivative of X and sends it to the regulator 5 for regulating, for example, the first building H. It is noted that weather data may be used as additional data for the regulation which is not explicitly indicated in this figure.

While specific embodiments of the invention have been shown and described in detail to illustrate the application of the principles of the invention, it will be understood that the invention may be embodied otherwise without departing from such principles.

The invention claimed is:

1. A method for carrying out an outside temperature-related control of a thermal property of at least a portion of a first building by regulation of a supply temperature of a first heating or cooling system of a first building, the method comprising the steps of:
controlling the regulation of the supply temperature on the basis of the at least one thermal power indicative parameter, wherein the at least one thermal power indicative parameter is indicative of the heat consumption or of the cooling power of at least one second heating or cooling system of a second building located at a distance from the first building;
receiving the at least one thermal power indicative parameter via a data network; and
receiving, at the first heating or cooling system of the first building, a leading signal indicative of a time derivative of the at least one thermal power indicative parameter from a data storage for controlling the at least one thermal power indicative parameter.

2. A method according to claim 1, wherein data indicative of the heat consumption or data concerning the cooling power of the at least one second heating or cooling system is collected continuously.

3. A method according to claim 2, wherein a determination of the accuracy of controlling of the at least one thermal power indicative parameter according to the leading signal is carried out.

4. A method according to claim 1, wherein the time derivative of the at least one thermal power indicative parameter is determined.

5. A method according to claim 1, wherein the distance of the at least one second building to the first building is incorporated into the control of the at least one thermal power indicative parameter of the first heating or cooling system according to the leading signal.

6. A method according to claim 1, characterized in that the at least one thermal power indicative parameter is indicative of the heat consumption or the cooling power of a plurality of additional heating or cooling systems of respective additional buildings being located at a distance from the first building.

7. A method according to claim 6, wherein a relation between the at least one thermal power indicative parameter of the first building and the additional heating or cooling systems of respective additional buildings are determined.

8. A method according to claim 6, wherein a gain factor is assigned to each of the additional buildings, wherein the gain factor is based on the relation between the at least one thermal power indicative parameter of the first building and the additional heating or cooling system of respective additional buildings, wherein the gain factors are adjusted on an ongoing basis.

9. A method according to claim 6, wherein the first heating system of the first building is a floor heating system.

10. A method according to claim 1, wherein the data calculated from the heat consumption or the cooling power received from the additional heating or cooling systems of the additional buildings is incorporated into the leading signal in a weighted manner.

11. A method according to claim 1, wherein the control of the thermal property further is based on
predetermined comfort specifications with respect to temperature, according to the time of day;
an energy flow rate; and/or
additional control information being transmitted by a user.

12. A method according to claim 1, wherein components arranged in the first heating or cooling system, which components comprise one or more of a circulation pump, at least one heat exchanger, and/or at least one valve, receive control data directly from a cloud-based data storage.

13. An arrangement for controlling a first heating or cooling system of a first building, the arrangement is configured to:
provide an outside temperature-related control of a thermal property of at least a portion of the first building by regulation of a supply temperature of the first heating or cooling system of the first building;
control the regulation of the supply temperature on the basis of the at least one thermal power indicative parameter, wherein the at least one thermal power indicative parameter is indicative of the heat consumption or of the cooling power of at least one second heating or cooling system of a second building located at a distance from the first building;
receive the at least one thermal power indicative parameter via a data network; and
receive, at the first heating or cooling system of the first building, a leading signal indicative of a time derivative of the at least one thermal power indicative parameter from a data storage for controlling the at least one thermal power indicative parameter.

14. A server being configured:
to receive one or more thermal power indicative parameter/parameters from at least one second heating or cooling system of a second building via a data network; adapted
to provide data to a first heating and cooling system of a first building via the data network, wherein the one or more thermal power indicative parameter serves for influencing the control of a thermal property of the first building, and wherein the at least one thermal power indicative parameter is based on the heat consumption or the cooling power of the at least one second heating or cooling system, and wherein the first heating or cooling system of the first building receives a signal indicative of a time derivative of the at least one thermal power indicative parameter from a data storage for controlling the at least one thermal power indicative parameter.

* * * * *